United States Patent [19]
Uistola

[11] Patent Number: 5,940,760
[45] Date of Patent: Aug. 17, 1999

[54] METHOD AND APPARATUS TO REDUCE NON-PUBLIC MODE SEARCH TIME IN A MOBILE STATION

[75] Inventor: Ari Uistola, Oulu, Finland

[73] Assignee: Nokia Mobile Phones Limited, Espoo, Finland

[21] Appl. No.: 08/857,931

[22] Filed: May 16, 1997

[51] Int. Cl.⁶ .................................................... H04Q 7/20
[52] U.S. Cl. .......................... 455/434; 455/435; 455/575
[58] Field of Search .................................. 455/450, 522, 455/421, 161.3, 575, 515, 525, 526, 434, 432, 63, 67.1, 552, 553, 462, 465; 370/332

[56] References Cited

U.S. PATENT DOCUMENTS

| | | | |
|---|---|---|---|
| 5,257,257 | 10/1993 | Chen et al. | 370/18 |
| 5,260,988 | 11/1993 | Schellinger et al. | 455/552 |
| 5,345,448 | 9/1994 | Keskitalo | 370/95.3 |
| 5,410,733 | 4/1995 | Niva et al. | 455/33.2 |
| 5,442,680 | 8/1995 | Schellinger et al. | 455/426 |
| 5,483,668 | 1/1996 | Malkamaki et al. | 455/33.2 |
| 5,524,009 | 6/1996 | Tuutijarvi et al. | 370/95.3 |
| 5,539,748 | 7/1996 | Raith | 370/329 |
| 5,574,996 | 11/1996 | Raith | 455/161.3 |
| 5,726,981 | 3/1998 | Ylitervo et al. | 370/332 |
| 5,778,316 | 7/1998 | Persson et al. | 455/434 |
| 5,794,146 | 8/1998 | Sevcik et al. | 455/434 |
| 5,822,686 | 10/1998 | Lundberg et al. | 455/161.3 |
| 5,828,963 | 10/1998 | Grandhi et al. | 455/450 |

OTHER PUBLICATIONS

IS–136.1 Rev A, Post Ballot Version, Feb. 12, 1996.
IS–136.1 Rev. A. Post–Ballot Version, Feb./Mar. 1996, pp. 91–96; 127–135; 178.

Primary Examiner—Reinhard J. Eisenzopf
Assistant Examiner—Charles N. Appiah
Attorney, Agent, or Firm—Perman & Green, LLP

[57] ABSTRACT

In an embodiment of this invention that is suitable for practicing in an IS-136 or similarly compliant system, a method for operating a mobile station (10) includes steps of (A) receiving a Control Channel Selection Parameters message with the mobile station; (B) storing a SCANINTERVAL value received with the message in a memory (24) of the mobile station; in response to a user specifying a new system during an execution of a Non-Public System, Digital Control Channel (NPS-DCCH) selection procedure, (C) modifying the stored SCANINTERVAL value so as to indicate a measurement interval equal to a period of one Hyperframe; (D) performing signal strength measurements on a channel of the user-specified system using the modified SCANINTERVAL value; and, at the termination of the signal strength measurements, (E) restoring the SCANINTERVAL value to the value received in the Control Channel Selection Parameters message. The step of storing also stores a DELAY value received with the Control Channel Selection Parameters message, and in one embodiment the step of measuring ignores the stored DELAY value, while in another embodiment the step of modifying also modifies the stored DELAY value to have a value that is less than an amount of time that the mobile station has already been camped on a current DCCH.

15 Claims, 3 Drawing Sheets

METHOD AND APPARATUS TO REDUCE NON-PUBLIC MODE SEARCH TIME IN A MOBILE STATION

FIELD OF THE INVENTION

This invention relates generally to radiotelephones and, in particular, to radiotelephones or mobile stations such as those capable of operation with a cellular network.

BACKGROUND OF THE INVENTION

In modern mobile telecommunications systems a mobile station may have a choice as to whether to operate with a public cellular system or with an autonomous system, such as a residential system of a private system. Typically it will be desirable to operate with a selected autonomous system, which may provide a more favorable rate structure than the public cellular system(s), or that may provide a desired service not offered by the public cellular system(s). A particular autonomous system may be a residential system that serves the user's home, or a private system that serves the user's workplace.

One such modern cellular system is referred to as IS-136, which is described in IS-136.1, Rev. A, February 1996, and subsequent updated releases. This system employs Digital Control Channels (DCCHS) that enable a mobile station to gain access to the system. When a mobile station scans for and subsequently monitors a DCCH, it is said to be "camped" on that particular DCCH. Page messages and other information are received from the DCCH.

In Section 6.3.19 of IS-136.1there is described a non-public mode search procedure that is to be implemented by IS-136 compliant mobile stations. As defined, while camping on a DCCH a mobile station user may decide to initiate a Non-Public Mode Search Condition in order to search for service with an alternate system (System Identification (SID), Private System Identification (PSID), or Residential System Identification (RSID)) on the current DCCH and/or other DCCHs. Two possible procedures are defined for Non-Public Mode Search: New PSID/RSID Search and Manual System Search.

Discussing first the New PSID/RSID Search procedure, when the user invokes this procedure the mobile station proceeds as follows. First the mobile station collects one signal strength measurement on each frequency in the current frequency band. Next, the mobile station makes a list of up to 24 channels with the strongest signals, and then tunes to the strongest channel in the list. The mobile station then determines if this channel contains a DCCH. If the channel contains a DCCH, the mobile station reads the Fast Broadcast Control Channel (F-BCCH) and determines therefrom if the DCCH is marked with a non-public Network Type (Private and/or Residential) that is enabled in the mobile station. If this is the case, the mobile station marks the DCCH as DCCH_1. If the channel does not contain a DCCH, or if the DCCH is not marked with a non-public Network Type that is enabled in the mobile station, then a determination is made if this is the last channel in the channel list. If it is, the procedure ends, otherwise the mobile station reads the next strongest channel in the channel list and the process repeats.

After possibly performing a Test Registration procedure, and marking an appropriate PSID/RSID as SYS_1, the mobile station displays an indication of SYS_1 to the user. If the user selects SYS_1, and after other processing, a determination is made if DCCH_1 is the current DCCH. If it is not, the mobile station adds DCCH_1 to a list of channels identified as requiring measurements (see Section 6.3.3.1, Control Channel Locking). The mobile station then, after an appropriate delay required for channel measurement purposes (see Section 6.3.3.3), declares a Priority System Condition (see Section 6.2.3) using DCCH_1 as the only reselection candidate. The CELLTYPE for DCCH_1 defaults to PREFERRED until otherwise determined. In addition, the mobile station determines the MS_ACC_PWR, RSS_ACC_MIN, SS_SUFF and DELAY (see Section 6.3.3.4.2) for DCCH_1 prior to involving or while executing the Control Channel Reselection procedure (see Section 6.3.3).

In the Manual System Search procedure, the mobile station proceeds as follows. The mobile station first searches the current DCCH and neighboring DCCHs (including Private Operating Frequencies (POFs) if they exist) for all candidates that support one or more of the PSIDs, RSIDs, and preferred SID that the mobile station subscribes to. The mobile station then displays a PSID/RSID Alphanumeric Name of each PSID or RSID supported by the candidate control channels that match a PSID or RSID stored in the mobile station, and the Alphanumeric System ID of the preferred SID. The mobile station then marks as DCCH_1 the candidate control channel supporting the SID, PSID, or RSID matching the Alphanumeric System ID or PSID/RSID Alphanumeric Name selected by the user. If more than one candidate control channel supports the selected PSID, RSID, or SID, then the candidate with the highest signal strength is marked as DCCH_1. If no SID, PSID, or RSID is selected by the user, the procedure is simply terminated.

If DCCH_1 is not the current DCCH, then the mobile station performs the same steps as described above for the New PSID/RSID search procedure, i.e., adding DCCH_1 to the list of channels identified as requiring measurements, etc.

In the foregoing procedures the interval of signal strength measurements depends on the values of the information elements SCANINTERVAL and HL_FREQ. The SCANINTERVAL information element is received by the mobile station in a Control Channel Selection Parameters message. This message is one of a Layer 3 message set that is received over the F—BCCH. The SCANINTERVAL information element represents a basic measurement interval (expressed in Hyperframes, each having a duration of 1.28 seconds) to be used for each frequency identified as requiring measurement. HL—FREQ is used to modify SCANINTERVAL (if HL_FREQ is low then the measurement interval for each frequency is twice SCANINTERVAL). The Control Channel Selection Parameters message also includes a DELAY information element which specifies a period of time that the mobile station must camp on its current DCCH before it can invoke a Candidate Eligibility Filtering procedure (see Section 6.3.3.4.1) in order to locate a new control channel.

In accordance with the foregoing procedures, and giving a worst case example, if SCANINTERVAL is set to 15 (max. value) then the measurement interval is 16 Hyperframes or 16*1.28 sec=20.48 seconds. Since the Reselection procedure requires five signal strength measurements to form the Long_RSS (Received Signal Strength) measurement value, the total measurement time becomes 5*20.48=102.4 seconds. Only after this amount of time elapses can the mobile station perform reselection. Furthermore, the Reselection Priority System Condition requires that the mobile station has camped on its current DCCH for a time period greater than that defined by the above-referenced DELAY information element. A maximum specified value for DELAY is 420 Superframes (two Superframes equal one Hyperframe), which implies a maximum time that the user must wait of 420*0.64=268.8 seconds.

While it may appear at first glance that the foregoing problems could be avoided if the serving system simply transmitted small SCANINTERVAL and DELAY values in the Control Channel Selection Parameters message; in practice the use of larger values provides for a reduction in power consumption of the mobile station. As such, there are advantages in not operating the mobile station at the minimum specified SCANINTERVAL and DELAY values.

When the user select selects either the New PSID/RSID Search or Manual System Search it is indicated that the user desires to select a new system at that time, and the user should thus be able to initiate the reselection procedure as soon as possible. As can be appreciated, the currently specified search procedures can result in a significant and user perceptible delay in executing the requested search.

OBJECTS OF THE INVENTION

It is thus a first object of this invention to provide an improved method for executing a system search procedure with a mobile station.

It is a further object of this invention to provide a method, and a mobile station constructed to operate in accordance with the method, for increasing a speed at which a mobile station is able to acquire and register with a non-public system.

SUMMARY OF THE INVENTION

The foregoing and other problems are overcome and the objects of the invention are realized by methods and apparatus in accordance with embodiments of this invention.

A method of this invention is disclosed for operating a mobile station, the method including a first step of storing information in the mobile station, the stored information being received from a currently serving system for indicating at least a channel measurement interval to be employed when performing signal strength measurements. In response to a user specifying a new system, the method modifies the stored information so as to indicate a minimum channel measurement interval, and then performs signal strength measurements on a channel of the user-specified system using the minimum channel measurement interval. At the termination of the signal strength measurements, the method restores the stored information to the originally received information. In this invention the user may specify one of a residential system or a private system, and possibly also a public system.

The step of storing also stores further information for indicating a minimum amount of time that the mobile station must camp on a current control channel before selecting a new control channel, and the step of performing signal strength measurements may simply ignore the further information. In a further embodiment of this invention the step of modifying also modifies the further information to have a value that is less than an amount of time that the mobile station has already been camped on a current control channel.

In an embodiment of this invention that is suitable for practicing in an IS-136 or similarly compliant system, the method for operating a mobile station includes steps of (A) receiving a Control Channel Selection Parameters message with the mobile station; (B) storing a SCANINTERVAL value received with the message in a memory of the mobile station; in response to a user specifying a new system during an execution of a Non-Public System, Digital Control Channel (NPS-DCCH) selection procedure, (C) modifying the stored SCANINTERVAL value so as to indicate a measurement interval equal to a period of one Hyperframe; (D) performing signal strength measurements on a channel of the user-specified system using the modified SCANINTERVAL value; and, at the termination of the signal strength measurements, (E) restoring the SCANINTERVAL value to the value received in the Control Channel Selection Parameters message.

The step of storing also stores a DELAY value received with the Control Channel Selection Parameters message, and in one embodiment the step of measuring ignores the stored DELAY value, while in another embodiment the step of modifying also modifies the stored DELAY value to have a value that is less than an amount of time that the mobile station has already been camped on a current DCCH.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
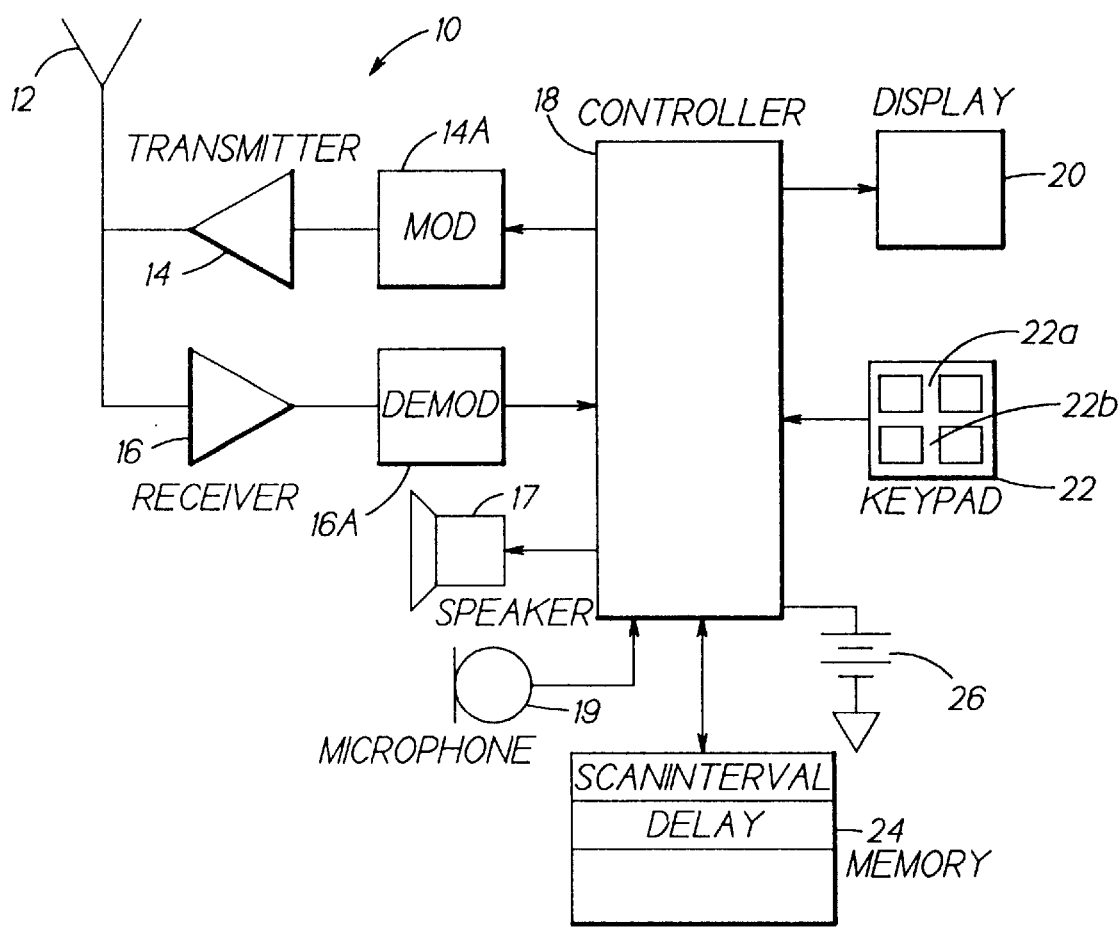
FIG. 1 is a block diagram of a mobile station that is constructed and operated in accordance with this invention.
Figure 2:
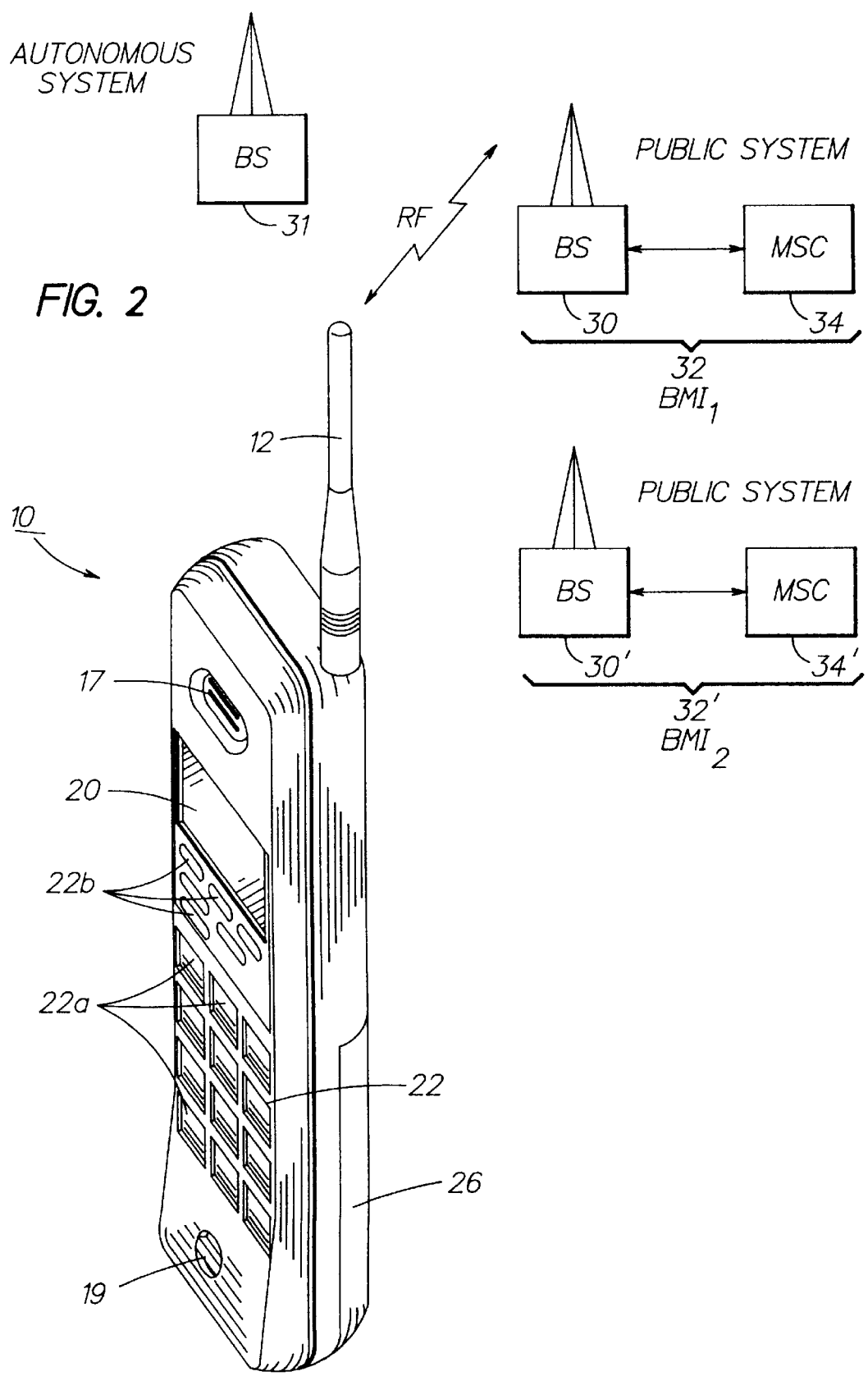
FIG. 2 is an elevational view of the mobile station shown in FIG. 1, and which further illustrates a plurality of cellular communication systems to which the mobile station can be bidirectionally coupled through wireless RF links.

Reference is first made to FIGS. 1 and 2 for illustrating a wireless user terminal or mobile station 10, such as but not limited to a cellular radiotelephone or a personal communicator, that is suitable for practicing this invention. The mobile station 10 can be a vehicle mounted or a handheld device. The mobile station 10 includes an antenna 12 for transmitting signals to and for receiving signals from a first base site or base station 30. The base station 30 is a part of a first cellular public system comprising a BMI ($BMI_1$) 32 that includes a mobile switching center (MSC) 34. The MSC 34 provides a connection to landline trunks when the mobile station 10 is involved in a call.

FIG. 2 also shows a second $BMI_2$ 32', having associated base station(s) 30' and MSC 32'. By example, the $BMI_1$ 32 may be associated with a first digital public system (e.g., PCS1900 or GSM), and $BMI_2$ 32' may be associated with a second public system, such as analog system or another digital system. Both public systems have an associated SID. If the two or more public systems are not the same (e.g., both digital TDMA systems that use the same air interface), then the mobile station 10 is assumed to have at least dual mode capability (e.g., digital TDMA and AMPS) so that it can operate in the different types of public systems.

FIG. 2 further illustrates a base station 31 that is associated with an autonomous system, such as a residential system having an associated RSID or a private system having an associated PSID.

The mobile station 10 of FIG. 1 includes a transceiver comprised of a modulator (MOD) 14A, a tuneable transmitter 14, a tuneable receiver 16, a demodulator (DEMOD) 16A, and a controller 18 that provides signals to and receives signals from the transceiver. These signals include signalling information in accordance with the air interface standard of the applicable cellular system, and also user speech and/or user generated data. As was indicated above, the transmitter, receiver, modulator and demodulator may be at least dual-mode capable, and may operate with the frequencies, modulation type, access type, etc. of several of the various public and private systems in the environment of the mobile station 10.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station 10.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The memory 24 also stores a list of channels to be measured, one or more SIDs, RSIDs, PSIDs, as described above, as well as a current SCANINTERVAL value and DELAY value, as received from a Control Channel Selection Parameters message.

The operating program stored in the memory 24 may include routines to present messages and message-related functions to the user on the display 20, typically as various menu items. These include a capability to enable the user to select a particular system, as described above with respect to the discussion of Section 6.3.19 of IS-136.1 for the Non-Public mode Search (NPS-DCCH) procedure. The memory 24 also includes routines for implementing the method described below in relation to FIG. 3.

In accordance with this invention, when executing the NPS-DCCH procedure the mobile station 10 uses a minimum specified value of SCANINTERVAL to make signal strength measurements, and either ignores the DELAY criterion or resets same to zero. The minimum SCANINTERVAL value specified in IS-136.1 is one Hyperframe, or 1.28 second. Assuming the use of the Long_RSS value, the total NPS-DCCH selection measurement time is thus 5*1.28=6.4 seconds. After the NPS-DCCH selection procedure is executed, the mobile station restores the original, or a most recently received, SCANINTERVAL value (and DELAY value if reset to zero).

Figure 3:
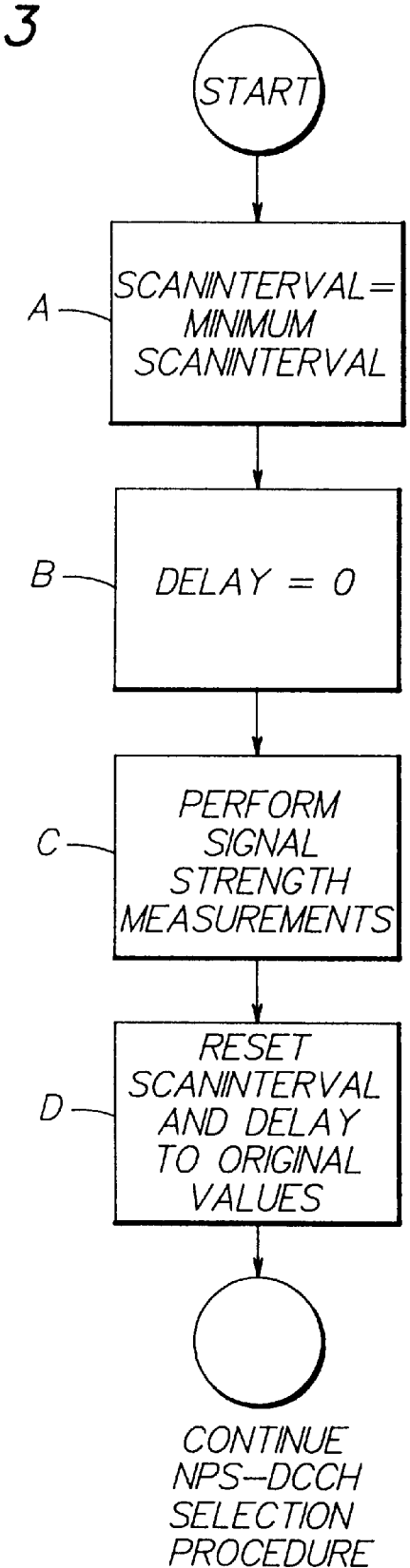
FIG. 3 is a logic flow diagram illustrating a presently preferred method for performing a non-public system mode search procedure with the mobile station illustrated in FIGS. 1 and 2.

Referring to FIG. 3, the above described New PSID/RSID Search and Manual System Search procedures are modified as follows. After the user has selected SYS_1 or a SID/PSID Alphanumeric Name, and after adding DCCH_1 to the list of channels requiring measurement, the controller 18 accesses the memory 24 and saves the current value of SCANINTERVAL, and possibly also DELAY, in a temporary location. At Block A, the mobile station 10 then overwrites the current value of SCANINTERVAL with the minimum allowed value. If desired, at Block B the mobile station 10 can also reset the DELAY value to zero, or to some value that is less than the time the mobile station 10 has already camped on the current DCCH. Alternatively, the mobile station 10 can simply ignore the value of DELAY by not making the comparison indicated in Section 6.3.3.4.1.

At Block C the mobile station 10 then performs the necessary signal strength measurements, using the minimum value of SCANINTERVAL set in the SCANINTERVAL location at Block A, in order to determine the value of Long_RSS. After performing the signal strength measurements, at Block D the mobile station 10 retrieves the saved value of SCANINTERVAL, and possibly also DELAY, from the temporary memory location, and restores the original SCANINTERVAL and DELAY values in the memory 24. The mobile station 10 then continues the NPS-DCCH selection procedure as presently specified.

It is possible for the mobile station 10 to receive another Control Channel Selection Parameters message, possibly with a new SCANINTERVAL and/or DELAY value, while in the NPS-DCCH search mode. In this case at least a portion of the latest Control Channel Selection Parameters message is buffered in the memory 24, and when the measurement is completed the mobile station 10 uses the last received values of SCANINTERVAL and/or DELAY to restore the previously modified value(s).

While described above as modifying the SCANINTERVAL value, and possibly also the DELAY value, it should be appreciated that it is within the scope of this invention to temporarily modify any value that directly or indirectly affects the total amount of time required for the mobile station 10 to acquire a desired new user-specified system. By example, and for the exemplary IS-136 example, it is also within the scope of this invention to also temporarily set the HL_FREQ value to HIGH, thereby eliminating a possibility that the measurement interval will be twice that specified by SCANINTERVAL (it should be noted that IS136 specifies that the mobile station may choose to measure all frequencies as if they have HL_FREQ set to high (see IS-136.1, Section 6.3.3.3.1)).

As such, and although described in the context of preferred embodiments, it should be realized that a number of modifications to these teachings may occur to one skilled in the art. By example, the teaching of this invention is not limited for use only with systems constructed and operated in accordance with IS-136, or only with digital TDMA cellular systems. Furthermore, the teaching of this invention applies as well to public system selection, when the SID is specified by the user.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station, comprising steps of:

storing information in the mobile station, the stored information being information that is received from a currently serving system for indicating at least a channel measurement interval to be employed when performing signal strength measurements;

in response to a user specifying a new system, modifying the stored information so as to indicate a minimum channel measurement interval;

performing signal strength measurements on a channel of the user-specified system using the minimum channel measurement interval; and at the termination of the signal strength measurements, restoring the stored information to the information that was received from the currently serving system;

wherein the step of storing also stores further information for indicating a minimum amount of time that the mobile station must came on a current control channel before selecting a new control channel, and wherein the step of modifying also modifies the further information to have a value that is less than an amount of time that the mobile station has already been camped on a current control channel.

2. A method as in claim 1, wherein the user specifies a residential system or a private system.

3. A method as in claim 1, wherein the user specifies one of a public system, a residential system, or a private system.

4. A method as in claim 1, wherein the step of performing signal strength measurements ignores the further information.

5. A mobile station, comprising:

a RF transceiver for bidirectionally communicating with base stations of public or autonomous communications systems;

a user interface for displaying information to a user and for receiving an input from a user;

a memory for storing information, the stored information including information received from a currently serving system for specifying at least one parameter that affects a time required to perform signal strength measurements on frequency channels; and a controller coupled to an output of said transceiver, to said user interface, and to said memory, said controller operating under the control of a stored program in said memory for modifying, in response to information entered by a user for specifying a new system, the at least one stored parameter from its original value so as to minimize the time required to perform signal strength measurements, for performing signal strength measurements on a channel of the user-specified system using the modified at least one stored parameter, and, in response to a termination of the signal strength measurements, for restoring said at least one parameter in said memory to its original value.

6. A mobile station as in claim 5, wherein the user specifies a residential system or a private system.

7. A mobile station as in claim 5, wherein the user specifies one of a public system, a residential system, or a private system.

8. A mobile station as in claim 5, wherein said at least one parameter specifies a basic measurement interval between measurements for each frequency channel identified as requiring a signal strength measurement.

9. A mobile station as in claim 8, wherein said at least one stored parameter is expressed in units of Hyperframes.

10. A mobile station as in claim 9, wherein said at least one stored parameter is modified to indicate a time interval equal to a duration of one Hyperframe.

11. A mobile station as in claim 5, wherein said at least one stored parameter specifies a minimum amount of time that the mobile station must camp on a current control channel before selecting a new control channel.

12. A method for operating a mobile station, comprising steps of:

receiving a Control Channel Selection Parameters message with the mobile station;

storing a SCANINTERVAL value received with the message in a memory of the mobile station;

in response to a user specifying a new system during an execution of a Non-Public System, Digital Control Channel (NPS-DCCH) selection procedure, modifying the stored SCANINTERVAL value so as to indicate a measurement interval equal to a period of one Hyperframe;

performing signal strength measurements on a channel of the user-specified system using the modified SCANINTERVAL value; and at the termination of the signal strength measurements, restoring the SCANINTERVAL value to the value received in the Control Channel Selection Parameters message.

13. A method as in claim 12, wherein the step of storing also stores a DELAY value received with the Control Channel Selection Parameters message, and wherein the step of measuring ignores the stored DELAY value.

14. A method as in claim 12, wherein the step of storing also stores a DELAY value received with the Control Channel Selection Parameters message, and wherein the step of modifying also modifies the stored DELAY value to have a value that is less than an amount of time that the mobile station has already been camped on a current DCCH.

15. A method as in claim 12, wherein if during the execution of the step of performing signal strength measurements the mobile station receives a second Control Channel Selection Parameters message, the method further comprises the steps of:

buffering at least a portion of the second Control Channel Selection Parameters message; and at the termination of the signal strength measurements, restoring the SCANINTERVAL value to the value received in the second Control Channel Selection Parameters message.

* * * * *

UNITED STATES PATENT AND TRADEMARK OFFICE
CERTIFICATE OF CORRECTION

PATENT NO. : 5,940,760
DATED : August 17, 1999
INVENTOR(S) : Ari Uistola

It is certified that error appears in the above-identified patent and that said Letters Patent is hereby corrected as shown below:

Claim 1, Col. 7, Line 21, delete --came-- and insert --camp--.

Signed and Sealed this

Eighteenth Day of July, 2000

Attest:

Q. TODD DICKINSON

*Attesting Officer*  *Director of Patents and Trademarks*